Dec. 23, 1941.   J. S. McWHIRTER   2,267,123
COMBINATION ELECTRODYNAMIC AND AIR BRAKE SYSTEM
Filed Sept. 13, 1939   3 Sheets-Sheet 3

Inventor.
JOHN S. McWHIRTER, DECEASED.
BY LILLIAN CHAPPELL McWHIRTER,
EXECUTRIX.
Darby & Darby
Attorneys.

Patented Dec. 23, 1941

2,267,123

UNITED STATES PATENT OFFICE 2,267,123

COMBINED ELECTRODYNAMIC AND AIR BRAKE SYSTEM

John S. McWhirter, Westport, Conn.; Lillian Chappell McWhirter executrix of said John S. McWhirter, deceased Application September 13, 1939, Serial No. 294,589

7 Claims. (Cl. 303—3)

This invention relates to a combination of simultaneously acting electro-dynamic and air brake systems for use wherever such combination is capable of use, but particularly adapted to and disclosed for use on vehicles such as, for example, street cars.

The combination braking system, as disclosed herein is illustrated in a form suitable for application to street cars. As will appear from the following disclosure, the combination includes electro-dynamic and air brakes interlocked by the air brake controller so that the dynamic brakes are always brought into use whenever the air brakes are used. In the system as illustrated the arrangement is such that the above combined application of the dynamic and air brakes results under all conditions, including normal operation and emergency operation and for either direction of movement of the vehicle.

An important object of the invention is the automatic interconnection of two or more vehicle electric driving motors in a manner to secure the full electro-dynamic braking effect of both at all corresponding speeds in conjunction with the application of the air brakes. A characteristic of this system is that both forms of brake are effective at all times so that the system does not have the undesirable characteristic resulting from a change over from one form of braking to the other during a stop, as has been suggested in the prior art.

For the purpose of providing a full disclosure of the nature and functions of the invention, it is necessary to describe at least generally the following characteristics and conditions involved in the braking of street cars. For many years street cars have depended upon air brakes as the main means of stopping them. It has also been the practice at times in the past to reverse the driving motors of the vehicle as an additional means of braking in cases of extreme emergency. However, this latter procedure was resorted to only in extreme cases because of the severe effect on the motors and because it did not provide a really reliable or uniform braking means. In this reversing process the motors were electrically connected together in pairs so as to oppose each other; no current being supplied from the line in an endeavor to cause them to rotate in a reverse direction. It is a matter of fact that if two motors of the same type and similar characteristics are rotating in the same direction and they are electrically connected together one will act as a generator and will produce a current that attempts to make the other motor revolve in the opposite direction to that in which both motors are revolving. This condition results even though the motors are supposedly of the same size, characteristics and ratings.

Obviously, at any speed above a few revolutions per minute, such electrical cross-connecting of the motors results in a very high current or a very high voltage, or both, through the motors and produces a very severe braking action which may actually cause damage to the motors in both their mechanical and electrical parts. Likewise, the severity of this braking action, which at times is highly erratic, may produce undesirably rapid changes in the velocity of the vehicle, rendering them impractical for such use, except as an emergency measure. Further motors so interconnected will act as a brake for only one direction of car motion, and if changed so as to produce braking for an opposite direction of vehicle motion, they will no longer produce braking for the original direction of vehicle motion.

Likewise in the past means have been provided whereby the motors of a street car can be electrically cross-connected in a manner to include a resistance in the circuit which is intended to control the currents produced by the motors by means of rather complicated apparatus intended to progressively reduce the amount of resistance in the circuit as the car approaches a stop, thereby to provide a uniform braking action down to a certain minimum speed entirely independent of the air brakes.

With these arrangements as now used the dynamic braking action thus resulting is used to very substantially reduce the speed of the car to be followed by a small amount of air braking used solely for the purpose of bringing the car to a final stop. In addition, there is sometimes used with such arrangements a magnetic track brake, all of which systems in addition make it possible to obtain very high rates of retardation both from high car speeds as well as from low car speeds. Such systems, however, are exceedingly complicated and expensive not only to construct and install but to maintain in operation. In addition, these systems have the exceedingly undesirable characteristic of a noticeable change in retardation at the time of change over from dynamic to air braking.

In a general way it is an object of this invention to gain the advantages of dynamic and air braking used conjointly at all times in a simple combination of elements, which is relatively inexpensive to construct, install and maintain without the undesirable characteristics such as those disclosed above.

To further fully understand the nature and scope of this invention, it is desirable to point out that the maximum braking that can be applied to any vehicle through the wheels is dependent upon the coefficient of friction between the wheels and the surface on which they are rolling. In the case of street car wheels on rails, the coefficient of friction between a wheel and the rail, or as it is more commonly called the factor of adhesion, has a numerical value which rarely exceeds 0.25. The meaning of this factor is that the maximum retarding force in pounds horizontally which can be applied through the wheels to the vehicle running on level, tangent track without causing the wheels to slip on the rail is 0.25 times the weight on the rails at the wheel. Of course, by means of sand and under exceptionally good conditions this factor may rise as high as 0.33, but for general purposes it is assumed to be 0.25 maximum and it is to be noted that when very bad conditions exist, such as mud or grease on the rails, this value may fall to almost nothing.

It should next be considered that between the brake shoe and the wheel the coefficient of friction rarely exceeds 0.2 and this only at very low wheel speeds. Due to the large wheel tread surface and the comparatively small brake shoe surface severe application of the brakes results in such a heavy pressure between the brake shoe and the wheel as to cause the shoe to heat up very rapidly. The result is then that the coefficient of friction falls off quite rapidly. Thus, due to the surface of the shoe becoming practically molten, where ordinarily there is a coefficient of friction between the wheel and the rail of at least 0.2 at all speeds of the wheel the coefficient of friction between the shoe and the wheel rarely exceeds 0.2 at very low speeds and if the brake is applied when the car speed and wheel speed is high, say thirty miles per hour, the coefficient of friction between the wheel and shoe becomes almost instantaneously less than 0.1.

With these facts in mind, it becomes evident that if the brake shoe is applied to the wheel at high car speed with a given force the retardation of the wheel will not be nearly as rapid as when the shoe is applied to the wheel at very low car speed with the same force. In other words, if a test is made on the car on which the brake shoe is applied to the wheel at some high speed, say thirty miles per hour, with a given force, it will be found that the retardation of the car will increase rapidly as the car slows down. The effect of this is that the car will decelerate at an increasing rate.

Obviously, the maximum pressure that can be applied by the brake shoe to the wheel must not result in the coefficient of friction between the shoe and the wheel exceeding that between the wheel and the rail for otherwise the wheel will stop and slide on the rail. It has been found from experience that as soon as a wheel slides on the rail the coefficient of friction between them rapidly decreases and the wheel sliding on the rail becomes a very ineffective brake. It is, therefore, obvious, that the force applied between the brake shoe and the wheel is limited to that which can be applied without wheel-sliding at low wheel speed, unless special apparatus is available which will automatically reduce the braking force created by the air brake system as the car speed decreases. Such apparatus is available but has proved complicated, unsatisfactory and expensive.

Considering the action which occurs when a dynamic brake application occurs it is evident that the action is the exact reverse of what occurs when the air brake is applied. If the motors are electrically connected together in pairs, and especially if the armatures and fields are interchanged, it is obvious that the higher the car speed, up to a certain limit, the greater will be the current and voltage interacting between the motors and the more effectively and the more powerfully the motors will attempt to stop the vehicle whereas at low car speed the motors rotating slower produce very little current and voltage and, consequently, provide very little resistance to the car motion. Further, due to the particular method of interconnecting the motors, as disclosed herein, both motors of a pair tend to function as generators and the wheels driven by each motor therefore function to retard the vehicle motion.

It is in view of these facts that the combination of the invention herein disclosed is possible. By the combined use of dynamic and air braking systems their opposed characteristics may be combined to provide a resulting braking force which is much more constant and may be said to be substantially constant for all vehicle speeds. It is a desirable and possibly necessary condition in the use of a combination of this type in accordance with this invention to provide permanent resistance in the circuits of the cross-connected motors to prevent excessive overloading of them at high car speeds and to more effectively attain a substantially constant braking action at all speeds normally encountered in street car operation. With such a combination it is possible, within reasonable limits, to obtain a total braking action which exerts an approximately constant retarding force from high speed all the way down to low speed, and this result can be attained without the necessity of complicated apparatus to vary the air brake pressure or the dynamic braking force as the car speed changes. These fundamental characteristics, as will be more fully explained in connection with the drawings, of these two types of braking systems, are used in accordance with this invention to compensate each other to the greatest possible extent.

This application is a continuation in part of my copending application Serial No. 247,857, filed December 27, 1938, and now abandoned.

Figure 3:
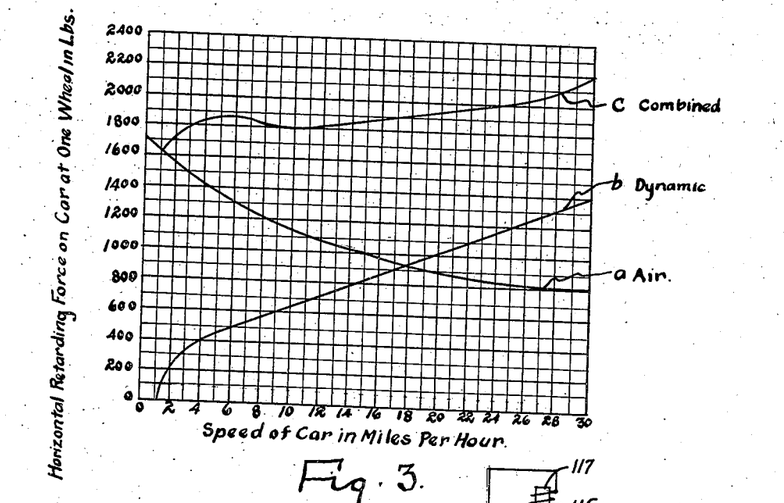
Figure 3 is a chart of the braking characteristics of air and dynamic braking systems individually and in combination in accordance with this invention.

The curve marked $a$ in Figure 3 shows the horizontal vehicle retarding force of one brake shoe as measured in pounds at various speeds, while curve $b$ shows similarly the horizontal vehicle retarding force in pounds of the dynamic brake as produced by ½ motor. Each motor drives two wheels which are united to the same axle so that the effect on one wheel is that of ½ motor, comparable therefore to the effect of one brake shoe. Curve c shows the combined retarding force of the combined air and dynamic brake system in accordance with this invention. As shown by curve a, as the speed of the vehicle falls off the retarding effect of the air brake increases and the range of variation for speeds from zero to thirty miles per hour is from 1700 pounds to 800 pounds in a typical example. The retarding force of the dynamic braking system, as shown by curve b, in a typical example for the same range is zero to 1400 pounds. When the same equipment is combined in accordance with this invention the resultant retarding force as represented by the curve c between the same limits varies only from about 1600 pounds to 2200 pounds. It will be noted that for speeds between 4 and 26 miles per hour the total range of variation is from about 1900 to 2100 pounds. This curve shows the remarkable reduction in variation in retarding force when used with a system in accordance with this invention. Obviously the possible numerical values of these retarding forces vary with different factors, such as weight of vehicle and capacity of motors, with a maximum limit of their sum fixed by a total force such as would just cause the wheel to slip on the rail.

Figure 1:
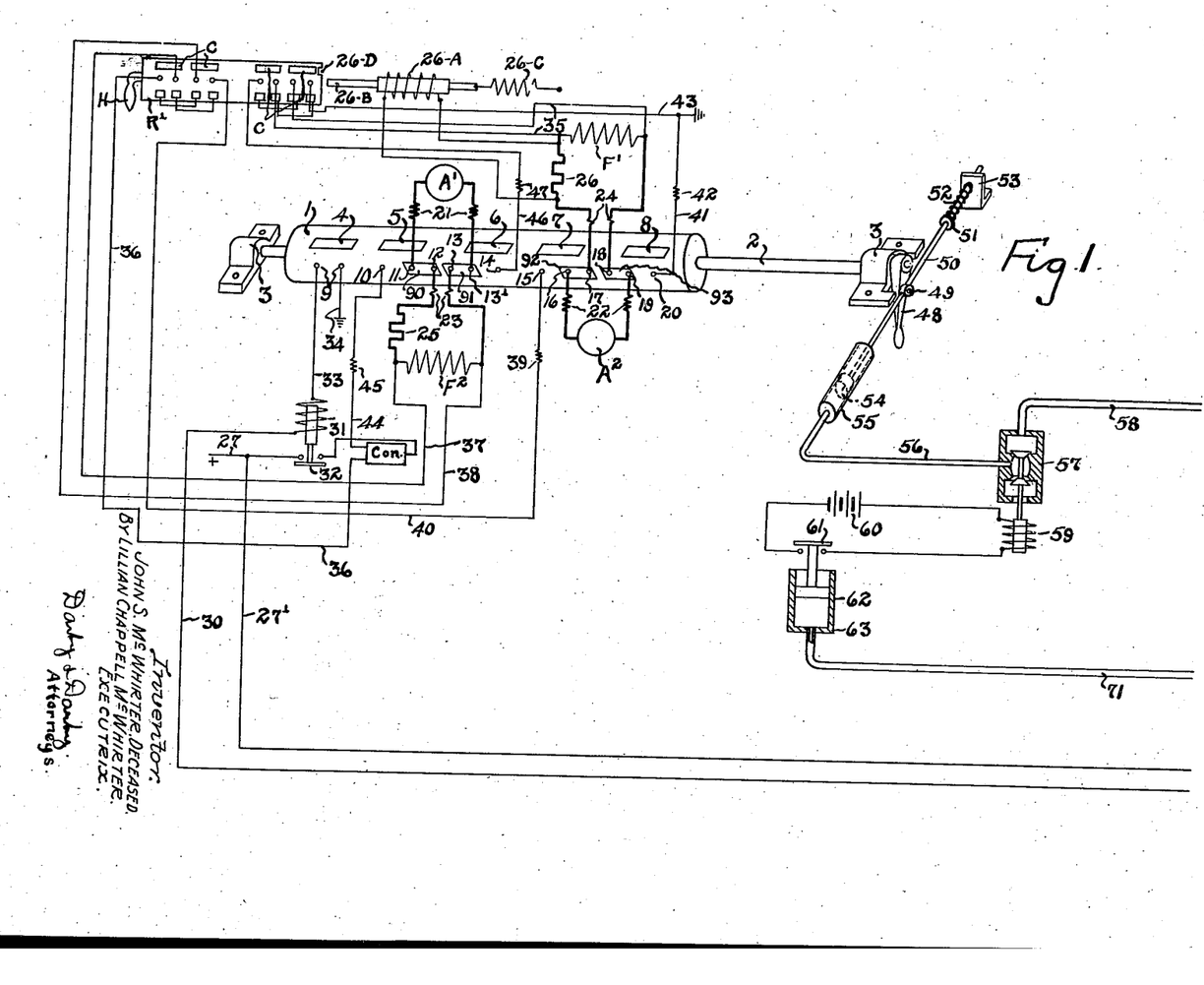
Figures 1 and 2 taken together comprise a diagrammatic illustration of one form of system embodying the invention.
Figure 2:
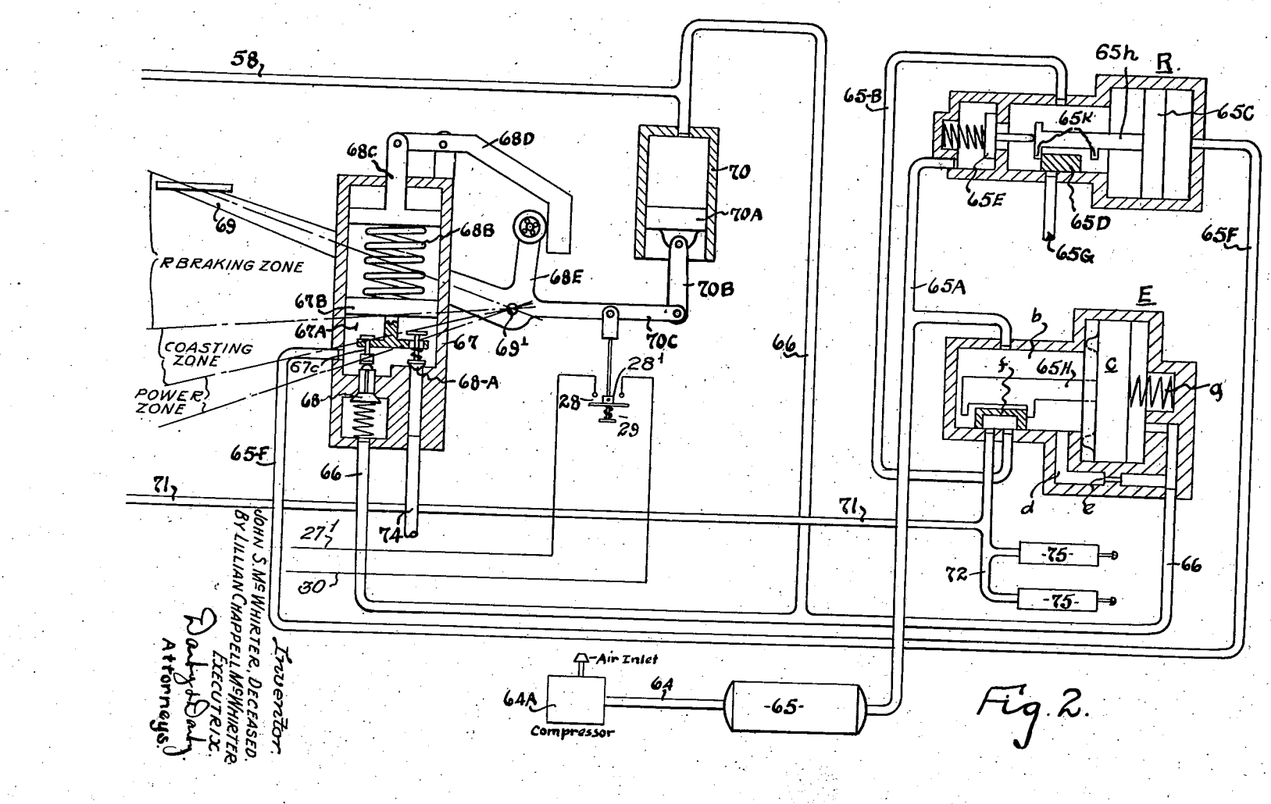

Referring to Figures 1 and 2, a system, according to this invention, is illustrated as including a combination of a dynamic braking system composed of two electric driving motors and an air brake system. Obviously any number of pairs of motors in a given vehicle may be so used. At 1 is shown a drum of a drum switch which may be constructed in accordance with many well known forms of this type of switch. It is rotatably mounted on a shaft 2 journaled in a pair of bearings 3. On it are provided two rows of contacts 4, 5, 6, 7, and 8, and 90, 91, 92 and 93 respectively. These contacts are mounted on the drum of the switch in accordance with well known practice and may assume any suitable form, arranged in two axial rows, as illustrated. At 9, 10, 11, 12, 13, 13', 14, 15, 16, 17, 18, 19 and 20 are shown a row of fixed contacts or fingers constructed and supported adjacent the drum of the switch so that it may move with respect thereto and bring either row of contacts on the drum in engagement with appropriate fingers. The fixed contacts may, for example, be in the form of suitably mounted spring fingers as commonly used in drum switches. At $A^1$ is diagrammatically shown the armature of one of the driving motors and at $A^2$ is similarly shown the armature of another driving motor. At $F^1$ and $F^2$ are also diagrammatically shown the fields for the armatures $A^1$ and $A^2$, respectively. The terminals of armature $A^1$ are connected through the magnetic blow-out devices 21 to the fixed contacts 11 and 13'. In passing, it may be noted that the magnetic blow-out devices 21 are diagrammatically illustrated and being well known in many forms are not disclosed in any detail except to note that they are small coils constructed and positioned to produce a magnetic field to blow-out or extinguish any arc which may occur at the related fixed contacts should the drum 1 be moved to break the circuits, at a time when current is flowing through the contacts. This is a common expedient to reduce destructive arcing. In a similar way the terminals of armature $A^2$ are connected to the fixed contacts 16 and 19 through the magnetic blow-out devices 22. The field $F^2$ is connected through the magnetic blow- out devices 23 to the contacts 12 and 13 and the field $F^1$ is connected through the magnetic blow-out devices 24 to the contacts 17 and 18. In these connections are, respectively, the resistances 25 and 26 whose function will be later described.

At this point it is to be noted that the connections for the motors thus far described are shown in heavy lines and represent the connections which are employed when the motors are cross-connected in pairs at the time when they are used as dynamic brakes. The normal operating circuits for the motors as set up when they are driving the vehicle are shown in lighter lines.

At $R^1$ is shown the reversing switch usually incorporated in the car controller, commonly employed in the street railway field and known in many forms. It is diagrammatically illustrated for the purposes of completeness. At 27 is shown the trolley circuit wire which connects to the positive side of the current source, such as the third rail or the trolley wire. It is connected by wire 27' to a pair of contacts 28 which are arranged to be interconnected by a contact disc 29. As more clearly shown in Figure 4, contact 29 is slidably mounted on its supporting stem. Its upward movement is limited by a collar 28' pinned on the stem and it is engaged by a spring as shown which urges it upwardly. The other contact of the pair is connected by the wire 30 to one terminal of the solenoid of a relay 31 which has a movable contact 32. The other terminal of the solenoid is connected by wire 33 to one of the contacts 9. The other contact 9 is grounded by the wire 34. Wire 27 also connects to one of the contacts of the pair arranged to be interconnected by the movable contact 32. The other contact of the pair is connected through the controller by wire 36 to one of the current supply terminals of the reversing switch $R^1$ and through wire 44 and blowout device 45 to contact 10.

The terminals of the motor field $F^2$ are connected by wires 37 and 38 to the switch $R^1$ in the usual way. The remaining terminal of the left hand section of the reversing switch $R^1$ is connected by wire 40 to the fixed contact 15 through the magnetic blowout device 39. Contact 20 is connected by wire 41 through the magnetic blow-out device 42 to ground by wire 43 and to one of the terminals of the right hand section of the reversing switch $R^1$. Contact 14 is connected through the magnetic blowout device 47 by wire 46 to the right hand section of reversing switch $R^1$. The terminals of the field $F^1$ are connected by the wires 35 to the two remaining terminals of reversing switch $R^1$. It may be noted here for emphasis that the connections between the motors and the reversing switches are one well known form of connection and the arrangement is such that the motors may be connected for operation of the motors, and consequently the vehicle, in either direction.

Connected to the end of shaft 2 is a lever 48 which cooperates with fixed stops on the bearing 3 so as to have a limited throw, as is apparent from the drawings. In the position of lever 48 as shown, the connections are made as illustrated while when this lever is in its other position the contact 4 interconnects the contacts 9, the contact 5 interconnects the contacts 10 and 11, contact 6 interconnects the contacts 13' and 14, contact 7 interconnects the contacts 15 and 16, and contact 8 interconnects the contacts 19 and 20.

Pivotally connected at 49 to the lever 48 is a rod 50 which is supported at one end by a bracket 53 and has mounted thereon a collar 51 between which and the bracket 53 is mounted a spring 52. Secured to the other end of the rod 50 is a piston 54 operating in an air cylinder 55. This cylinder is connected by pipe 56 to a valve 57. The pipe 58 of the valve is the fluid pressure supply pipe connected to any suitable source of pressure fluid and, as will be explained later, desirably connected to the emergency pipe line 66 of the vehicle. The stem of the valve 57 cooperates with a solenoid winding 59, one terminal of which is connected to a suitable current source 60 and the other terminal of which is connected to one of a pair of contacts controlled by movable contact 61. The other contact of the pair is connected to the other terminal of the current source 60. The movable contact 61 is connected to a piston 62 operating in an air cylinder 63. At 64 is a pipe connected to any primary source of pressure fluid supply such as a pump 64ᵃ. Pipe 64 extends to the reservoir 65 which is connected by a pipe 65A to both the emergency valve E and the relay valve R. Relay valve R consists of a chamber in which operates piston 65C, slide valve 65D, controlling an exhaust port and pipe 65G and application valve 65E. One side of piston 65C is connected by pipe 65F to chamber 67A of foot operated self-lapping brake valve 67. The other side of piston 65C is provided with piston rod 65h so as to operate slide valve 65D whenever piston 65C moves sufficiently to cause either of shoulders 65K on piston rod 65h to contact slide valve 65D. Further, whenever piston 65C moves far enough to the left it comes in contact with the stem of application valve 65E and unseats it. Foot operated self-lapping brake valve 67 comprises a casing, a piston chamber 67A closed by piston 67B, an application valve 68, an exhaust valve 68A within chamber 67A, and a coil spring 68B resting on piston 67B which can be compressed through link 68C and lever 68D by crank arm 68E. This crank arm is operated by foot pedal 69 which pedal is held in the brake applied position as shown by air pressure in cylinder 70, the force of which is transmitted through piston 70A, link 70B and crank arm 70C. Pipe 65A also connects to chamber b of emergency valve E from reservoir 65. Chamber b contains piston c, slide valve f and spring g and is connected through passage d and choke e to the other side of piston c and to pipe 66. Piston c has a piston rod 65H provided with lugs to operate valve f. Pipe 66 which is the emergency pipe connects to the application valve 68 of foot operated self-lapping brake valve 67, to cylinder 70, and to valve 57 (via pipe 58).

The operation of this system will now be described in full detail. It will shorten the later description to provide a preliminary explanation of the condition of the apparatus as illustrated in Figures 1 and 2 and how it attained that condition. For the moment it will be assumed that the vehicle, on which the apparatus of these figures is mounted, is at rest. The lever 69 is shown in its uppermost position which is the one it will take, in accordance with the well known operation of self-lapping brake valves of this type, when the operator's foot or hand is removed from the lever. At this time switch 28 is open, as shown, so that the power supply is cut off because the circuit to solenoid 31 is broken, opening switch 32; simultaneously this circuit is also broken at contact 9. The self-lapping brake valve 67 is in a state of equilibrium as air has been supplied to the brake cylinders 75 at the full pressure corresponding to the preselected, predetermined or preadjusted strength of spring 68B. The function of the spring 68B and its adjustment or initial preloading is, of course, also well known in this art, but will be briefly referred to at the proper time. This self-lapping valve attained a state of equilibrium as follows: As soon as lever 69 was released so that it is moved to the position shown in Figure 2 by the air in cylinder 70 acting on piston 70A, the arm 68E caused counterclockwise rotation of lever 68D, causing the link 68C to move to the position shown, in which position it is held and provides an immovable reaction support for the spring 68B. Air under pressure is always present in cylinder 70 when the system is in use, receiving it from reservoir 65 through pipe 65A, space b of valve E, passages d and e, and pipe 66. The function of cylinder 70 and its piston 70A is that of a spring which could be used in place of it. The result is that lever 69 always assumes its uppermost position when released and any other position in its range by varying the manual pressure thereon. The movement of the link 68C to that position caused piston 67B to move downwardly by the force acting through spring 68B. The downward movement of the piston 67B acting through the member 67C moved the application valve 68 downwardly to open it so that air at reservoir pressure was supplied through pipe 65A to chamber b of emergency valve E through port d and through choke e to emergency pipe 66, from whence it traveled to the self-lapping brake valve 67 through application valve 68 and through pipe 65F to one side of piston 65C in relay valve R. Piston 65C was thereby moved to the left carrying piston rod 65h with it and causing slide valve 65D to close the exhaust through pipe 65G and opening application valve 65E. Thereupon air flowed from pipe 65A through relay valve R into pipe 65B and thence through slide valve f in emergency valve E to pipes 71 and 72. Thus air was supplied at the same time to brake cylinders 75 and to cylinder 63. Air also flowed to cylinder 70 through emergency pipe 66 and through pipe 58 to valve 57. The pressure in these various lines and devices quickly built up to a pressure corresponding to the predetermined strength of spring 68B. This spring was adjusted or calibrated so that any desired maximum pressure could be built up in these pipes and devices. As the pressure built up in these pipes and devices, it of course built up in chamber 67A of the self-lapping valve 67, and therefore acted on piston 67B to gradually raise it against the reaction of spring 68B. When the pressure in chamber 67A has reached a value equal to that for which spring 68B has been preset or preselected, piston 67B will have risen sufficiently so that application valve 68 closes.

The apparatus is now in a state of equilibrium with the brake cylinders supplied with air pressure at the predetermined maximum value referred to and air is, of course, supplied at the same pressure to cylinders 70 and 63. Thus piston 70A holds the lever 69 in the position shown and acting through the various levers forms a fixed reaction surface against which spring 68B bears.

This description of the operation of the self-lapping valve is in accordance with the usual and well known manner of operation of such valves. By the proper selection of spring 68B or the proper adjustment thereof the maximum fluid pressure supplied to the air brakes can be made any desired value within the limits of the apparatus such as 30, 40, 50 pounds and the like. Therefore, every time the lever 69 is completely released air will be supplied to the brake cylinders at that predetermined pressure and when it is reached application valve 68 will close. At the same time piston 65C in relay valve R has moved to the right to close application valve 65E but not enough to move slide valve 65D far enough to open exhaust port 65G. At this time the brake valve 67 and the relay valve R will be in what is known as lap position. In other words, these valves will have lapped themselves and the air pressure in the brake cylinders will be, as emphasized above, that for which spring 65B has been preadjusted or selected. It will now be apparent that spring 68B may be calibrated, adjusted or preselected to provide any desired maximum air braking pressure up to full reservoir pressure, and this valve therefore permits having, if desired, a maximum air brake pressure for service application that is less than emergency air brake pressure which always equals reservoir pressure.

The air pressure applied to cylinder 63 has moved piston 62 as shown to break the circuit to the solenoid 59 at 61. The result is that valve 57 is in the position shown and cylinder 55 is open to exhaust through pipe 56 and the lower part of the casing of valve 57. This leaves the spring 52 acting through rod 50, lever 48 and shaft 2 free to hold the drum 1 in the position shown. In other words, as soon as air is supplied to the brake cylinders switch 61 opens and drum 1 moves to the position shown, connecting the armature A' to the field F² and armature A² to the field F'' as shown in Figure 1.

It was assumed up to this point that the vehicle was not moving, but if it be assumed now that the vehicle is moving armatures A' and A² are being rotated by the wheels of the axles and their connections thereto with the result that they are both acting as generators and the current being produced by them is dissipated in the resistances 25 and 26 in the form of heat. The current generated in armature A' by reason of its rotation in the magnetic field of the field coils F'' circulates through the field coils F² in the heavy line circuits as illustrated. A similar result occurs in connection with the circuit interconnecting the field coil F' and the armature A². The amount of current flowing in these circuits, and therefore the effective dynamic braking action for any given vehicle speed, and hence speed of rotation of the armature, is determined by the respective values of the resistances 25 and 26. As explained above the dynamic braking action of a cross-connected arrangement such as this is much more stable, uniform, and effective than would be the case where the motors are not cross-connected as illustrated. This dynamic braking action results for motion of the car in the direction for which the reverser R' is thrown, while the so-called "bucking motor" braking action will result if the car moves in a direction opposite to that for which the reverser R' is thrown.

The movement of drum 1 to the position shown also breaks the circuit to the solenoid 31 at the contacts 9, as is apparent from Figure 1. Thus the control circuit for the solenoid 31 is broken at the contacts 9, as well as at the switch 28 at which it had previously been broken.

When the brakes are released with the intention of operating the vehicle under the power of its motors the operator moves the valve lever 69 from the position shown to its lowermost zone, called the "power zone," at which time pipe 65F is connected to exhaust pipe 74, releasing air pressure from piston 65C in relay valve R. At the same time switch 28—29 closes. Air pressure in pipe 71, brake cylinders 75, and pipes 72 and 65B then forces piston 65C in relay valve R to the right, thereby moving slide valve 65D to uncover exhaust port and pipe 65G, permitting air in pipe 71 to escape to exhaust. The release of the pressure to the air brakes opens cylinder 63 to exhaust through pipe 71 as above explained and switch 61 is closed. Thus a circuit, as is obvious, is completed to the solenoid 59 so that valve 57 is operated to its other position, cutting off pipe 56 from exhaust and connecting it to the pressure supply pipe 58. Thus air is supplied to cylinder 55 forcing piston 54 to the right, carrying rod 50, lever 48 and shaft 2 with it. Spring 52 is compressed. This movement of shaft 2 carries the drum 1 with it so that the other row of contacts 4, 5, 6, 7 and 8 now cooperate with the fixed spring fingers 9, 10, 11, etc.

With this position of the drum it will be seen that the circuit to the solenoid 31 is completed at contacts 4 and 9, closing switch 32 and supplying operating current to the motors through the vehicle controller "Con.," shown diagrammatically, and wires 36 and 44. Contact 5 interconnects spring fingers 10 and 11 and contact 6 interconnects spring fingers 13' and 14. A circuit is then completed from the "Controller" through wire 44, contact 5, armature A¹, contact 6, wire 46, left hand contact C of reversing switch R¹ (which is closed in that position for forward movement of the vehicle), one wire 35, field winding F¹, the other wire 35, the right hand contact C, and to ground through wire 43. Thus the armature A¹ and field F¹ are connected in series between the current source 27 and ground. Likewise, current flows from wire 36 through the left hand contact C of the reversing switch R¹ (which is closed in that position for forward movement of the vehicle), wire 37, field F², wire 38, right hand contact C, wire 40, contact 7, armature A², contact 8, and wire 41 to wire 43. Thus the armature A² and field F² are connected in series between the current source 27 and ground. It will, of course, be understood that the amount of current for these motors and whether they are in series or parallel with each other is controlled by the controller "Con." of a type commonly used in vehicle operation such as street cars.

It will be seen, of course, that the cross-connecting circuits represented by the heavy lines have been broken by the movement of the drum and the regular car motor operating circuits have been set up. This is a good place to note again, as is well known in the art, that a control valve of the type 67—68 is a self-lapping pressure reducing valve and has three zones of operation. As previously explained, in the position shown in Figures 1 and 2 the brakes are fully applied and the valve is in "lapped" position. When lever 69 is in its other or downward extreme position they are fully released. It may be noted that this type of arrangement acts as a "dead man's valve" in that the operator must always consciously hold the lever 69 in its lowermost zone position to keep the brakes released. For all positions of the lever 69 in the "power zone," switch 28—29 is closed which result is secured because the contact 29 is free to slide on its supporting stem under the control of the spring engaging it. When lever 69 is in this zone, current can be applied to the motors to operate them as motors because switch 28—29 is always held closed, keeping switch 32 closed, and air is not admitted by valve 67—68 to air switch 63, thereby keeping drum 1 in normal motor operating position. In the next zone of lever travel, called the "coasting zone," switch 28—29 is open, causing switch 32 to open and thereby preventing the application of current to the motors. At the same time valve 67—68 still does not admit air to air switch 63. This is commonly called the coasting position of the valve, at which time air is not supplied to the air brake cylinders and switch 32 is kept open so that the power cannot be applied to drive the motors. As lever 69 travels further upward into its uppermost zone, called the "braking zone," switch 28—29 remains open. Air is admitted at the same time to cylinder 63 thereby opening switch 61 and de-energizing magnet valve 57. This permits spring 52 to move drum 1 to the position shown in Figure 1, cylinder 55 being open to atmosphere through valve 57 because of the de-energization of magnet 58. Of course the movement of the drum to the position shown sets up the connection for the dynamic braking.

It will be apparent to those familiar with the operation of self-lapping brake valves of the type disclosed that the operator may supply air to the air brakes under any pressure from zero to the maximum for which the spring 68B has been preset. In other words, for different positions of the lever 69 in the "braking zone" the brake air pressure may be controlled at will. As lever 69 moves into this zone link 68C descends a small amount compressing the spring 68B a correspondingly small amount, and, of course, opening application valve 68 so that air under pressure flows into chamber 67A and to pipe 65F as before. As soon as the pressure in chamber 68A reaches a point where it causes piston 67B to move up a sufficient distance so that application valve 68 closes the air pressure in the brake cylinders does not increase further. The pressure therein will correspond to the reaction on spring 68B for the particular position of the link 68C as determined by the position of lever 69. The further lever 69 moves upwardly into the braking zone, the higher will be the pressure in the brake cylinders because of the fact that the link 68C has correspondingly descended. Thus an important object of the invention is provided, viz. of being able to apply the air brakes with any desired force between zero and a predetermined maximum.

Reference has been made to emergency pipe 66. Examination will show that if this emergency pipe is opened to atmosphere at any point either by operation of passenger's or operator's emergency valves, well known in the art, or by rupture of the pipe itself, then the air in this pipe will escape freely and reduce the pressure on the right hand side of piston c in the emergency valve E. Reservoir pressure in chamber b on the other side of piston c will attempt to maintain pressure equilibrium on both sides of the piston by flowing through port d and choke e. The restricted choke e prevents rapid flow of air therethrough so that the air pressure will remain high on the left-hand side of piston c and will rapidly drop on the right hand side thereof. As a result, the piston c is moved to its farthest right hand position overcoming the spring g. This movement of the piston carries slide valve f with it, closing off passage d to prevent further supply of air to the emergency pipe 66 therethrough. At the same time this valve connects chamber b which is at reservoir pressure with pipes 71 and 72 supplying the full reservoir pressure to the brake cylinders 75. Obviously, then, any large loss of pressure in emergency pipe 66 will automatically cause a brake application at reservoir pressure and even though valve 57 be held in its uppermost position connecting pipe 58 to pipe 56, a dynamic brake application will also occur since pipe 58 is supplied by emergency pipe 66 now connected to the atmosphere.

As explained before, pipes 66 and 58 are connected to the "emergency pipe" of the vehicle so that under all abnormal conditions, and particularly during emergencies, fluid pressure is supplied to the brake cylinders even if the remainder of the apparatus is damaged. Thus the switch 61 is held open under these conditions and cylinder 55 is open to exhaust so that the spring 52 even under emergency conditions moves the drum 1 to the position where the dynamic braking comes into action.

It is furthermore to be noted that the system is of such a nature that whether the vehicle is going forward or backward the dynamic braking can come into play whether consciously operated or under emergency conditions. Indeed, under the worst conditions with complete loss of air in the braking system it will be seen that valve 57 will move to the position shown in Figures 1 and 2 so that spring 52 can move the drum to dynamic braking position.

Now that the description of the operation of the system has been given, it will be noted that the apparatus is so arranged that whenever an air brake application is made a full dynamic brake application is also made. In other words, the two systems are so interconnected that they are both automatically applied at the same time and every time the air brakes are applied. With the system it is possible for the operator to apply as much or as little air to the brakes depending upon the manner he manipulates lever 69 within the range of the system. He cannot, however, graduate the dynamic brakes off and on. The degree of braking effected by the dynamic brake is dependent only upon the speed of the car, being higher the greater the speeds.

In normal use, therefore, this combined system of braking enables the operator to obtain dynamic braking every time he applies the air brake. If it is his desire to merely slow down the car, the braking thereof down to the minimum speed at which the motors, acting as generators, become ineffective will be due to the dynamic brake. The operator is at liberty, however, to apply the air brake, at the same time and control its force of application as previously explained.

One of the vital features of this system lies in the fact that neither brake can be applied independently of the other and there can, therefore, never result any form of shock due to change of rate of vehicle retardation such as almost invariably occurs when one of these two types of brakes is applied first and the other brought in later, or when they are released independently even though this be done automatically. Furthermore, as indicated by the graphs, in Figures 1 and 2, whenever it is desired to make a vehicle stop from any speed in the shortest possible distance the two brakes will function as indicated by the curve c, giving an average rate of retardation of the vehicle that remains reasonably constant throughout the stopping period.

Obviously, also, when the dynamic brake is not in use, that is, during coasting, and running with power on, the normal motor control apparatus is able to function in its customary manner and the dynamic brake portion of the system can in no way interfere with such operation.

Under emergency conditions where it is desired to operate the vehicle the lever 48 can be moved back from the position shown to its other position manually and held there. It might also be noted that even upon the failure of the current source 60 which would normally be a battery or failure of the interlocked mechanism at any point results in the application of the dynamic brakes. In other words, the principles of this invention have been embodied in a form such that failure anywhere automatically results in application of the dynamic brakes. The system is so arranged that the chance of the dynamic brake system failing is a very minimum.

A desirable added feature may be applied to the system thus far described as illustrated in Figures 1 and 2 in connection with the resistance 26. The reversing switch $R^1$ is provided with an automatically operating latch which prevents the movement of the reversing switch to off position at any time during application of the dynamic brakes. This is desirable because on occasion the vehicle operator may attempt to move the reversing switch to off position at a time when it is desired to have the dynamic braking effect. In order to prevent this an automatically operating latch is provided so that the reversing switch can be moved to off position only at times when the dynamic brakes are not in operation. To accomplish this result the drum of the reversing switch $R^1$ is provided with a notch with which cooperates a longitudinally movable pin or latch 26B to which is connected a tension spring 26C which normally holds this latch out of engagement with the notch 26D on the drum. Associated with the latch is a solenoid 26A which is shunted across the resistance 26C so that whenever the dynamic brakes are working the solenoid 26A will be energized to move the latch 26B into the notch 26D against the tension on spring 25C. It is not possible then to move the drum of the reversing switch $R^1$ by means of its usual operating handle H from the "on" position.

At this point it may be noted, as will be apparent to those familiar with this art, that in a complete system in accordance with Figures 1 and 2 in addition to the use of any adjuncts commonly employed with such systems but not essential to this disclosure there would be used two of the self-lapping valves 67, one for each end of the car. Likewise, the reversing switch $R^1$ would be duplicated at the other end of the car. Of course, where the vehicle has more than two driving motors more than one of the drum switches could be used or the contacts arranged on a single drum so that more than one pair of motors could be cross-connected as in accordance with this invention, when desired.

Figure 4:
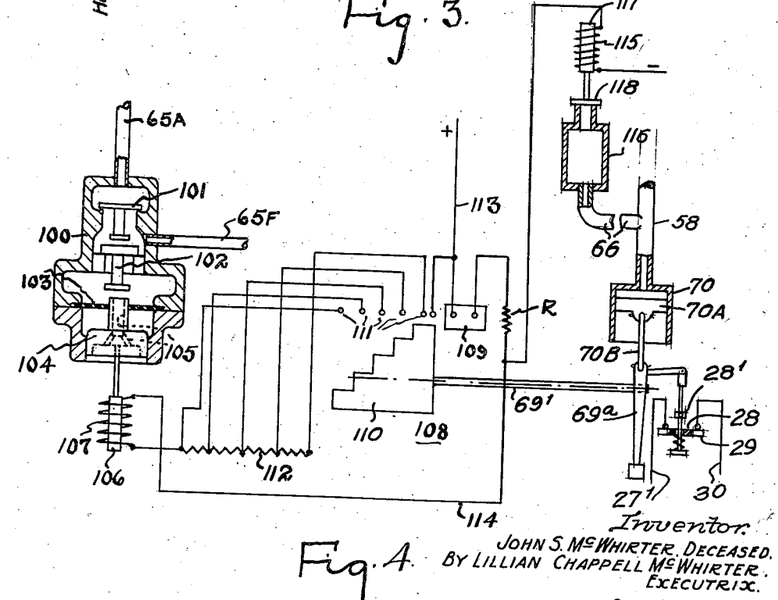
Figure 4 is a diagrammatic view of a modification of a portion of the system shown in Figures 1 and 2.

There is illustrated in Figure 4 a modification of a portion of the system of Figures 1 and 2 wherein only a single self-lapping reducing valve would be employed. As illustrated in Figure 4, this self-lapping valve is electro-magnetically controlled and there would be provided two controllers for it, one at each end of the car, which controllers would be operated by the vehicle motorman in the same manner as he would operate the self-lapping valves 67 directly.

In accordance with the arrangement of Figure 4, the self-lapping reducing valve in this case is shown as comprising a casing 100 forming a large chamber open at the bottom. The upper portion of the chamber is closed off by means of a valve 101 and the compartment thus formed is connected to the reservoir 65 through the pipe 65A. The chamber is next divided into another compartment by means of a diaphragm 103 sealed in the casing and closing the chamber to form a compartment between it and the uppermost compartment and to which pipe 65F is connected. Supported in this second chamber is an operating member 102 for the valve 101, the function of which will be described later. This member is supported for vertical movement and is limited in its movement by reason of its shape in cooperation with the apertured wall in the compartment, as is clear from Figure 4. Secured to the diaphragm 103 with an airtight joint in any suitable manner so as to move therewith is a member 104 which is guided in its sliding movement in the casing 100 and which is ported to atmosphere as indicated at 105. Connected to the diaphragm through the member 104 is a plunger 106 which is controlled by a solenoid 107. The controller, one of which is used at each end of the vehicle, is illustrated diagrammatically at 108. It consists of a movable member of any suitable form, such as a drum, as is common in devices of this type having the contacts 109 and 110 mounted thereon in the relation shown. It will be assumed that these contacts move upwardly in Figure 4 from the position shown which will be the normal "off" position when the brakes are not applied. The contacts 109, 110 overlap, that is to say, contact 110 engages the first spring fingers 111 before the spring fingers which cooperate with contact 109 leave it. At 113 is a power supply lead which goes through the contact 109 and is connected by wire 114 through resistance R to one terminal of the solenoid 115 and to one terminal of solenoid 107, the other terminal of which is connected to ground at the other side of the current source. A plunger 117 cooperates with this solenoid so that when the solenoid is energized the plunger is in the position shown holding the valve disc 118 connected to it on a seat in the casing 116, which is connected to the emergency pipe 66. The wire to solenoid 115 is connected by wire 114 to one terminal of solenoid 107, the other terminal of which is connected to a resistance 112 and is provided with a series of tabs which connect respectively to the spring fingers 111 of the controller.

The electric controller 108 is operated by the foot lever 69a which corresponds to the lever 69 of the previous arrangement and is operated as previously described in connection with lever 69. The lever is mounted on a shaft 69' corresponding to the pivot pin of the previous arrangement. This shaft 69' is the shaft of the drum of the control switch 108 on which drum the contacts 109 and 110 are mounted. The lever 69a is as before connected by a link 70B to a piston 70A in the cylinder 70. The pipe 58 is connected to this cylinder as before and to pipe 66 as before. The switch 28—29 is operated by lever 69a as before, as illustrated in the drawings. The contact 29 is slidably mounted on the stem and is limited in its upward movement by the collar 28' pinned to the stem. The parts are shown in Figure 4 with lever 69a in its lowermost position, that is in the "power zone." Thus switch 28—29 is closed and power is being supplied to the controller "CON" to permit operation of the vehicle driving motors as before. All brakes are fully released. From this description it will be seen how the modification of Figure 4 easily fits in to the system of Figures 1 and 2 by replacing the manually operated self-lapping pressure reducing valve 67 by the electrically controlled pressure reducing self-lapping valve 100.

The operation of this arrangement will now be described. It will be noted that solenoid 115 is always energized for the position of control 108 shown in Figure 4, or in operating position thereon, that is, when the contacts move upwardly. The valve 118 is an emergency valve which when opened permits the pressure to fall in the emergency line 66 and apply the brakes with full pressure. This result occurs if the current to the solenoid 115 falls for any reason. At all times current reaches the solenoid 115 through the circuit, as will be explained, so that valve 118 remains closed, which is its normal position.

When the operator permits lever 69a to move up into the braking zone, controller 108 first moves so that contact 110 interconnects the right hand pair of contacts 111. Current then flows from wire 113 through contact 110, all of resistance 112, solenoid 107, wire 114, and thence through solenoid 115 to ground or the negative side of the line. By this movement the circuit through resistance R and wire 114 to solenoid 115 is broken at contact 109 but it is not broken until the circuit to solenoid 115 is made at contact 110 through solenoid 107. Thus valve 118 does not open. It will be seen that solenoid 115 gets its current at this time through solenoid 107 instead of resistance R but the parts are so proportioned that even though there may be a slight change in amount of current, valve 118 does not open. Resistance 112 is so proportioned that it moves the member 104 and diaphragm 103 upwardly by a predetermined amount. This movement thereof seals the exhaust passages 105 by the engagement of the member 104 with the member 102. At the same time the member 102 engages valve 101 and unseats it. These parts have moved a distance in proportion to the value of resistance 112. Fluid under pressure then flows from pipe 65A past valve 101 and into pipe 65F. It builds up a pressure in pipe 65F and the various parts connected thereto, causing an operation thereof the same as results from the operation of the self-lapping valve 67.

Valve 100 is also a self-lapping valve as will be explained. As the pressure in pipe 65F builds up the pressure in the chamber above diaphragm 103 builds up at the same rate. As the pressure builds up in this chamber, diaphragm 103 moves downwardly against the upwardly urging force of solenoid 107.

This movement continues until valve 101 seats, cutting off the supply of air from the reservoir through pipe 65A. When this occurs pressure stops building up in the chamber and diaphragm 103 stops its movement so that member 104 does not disengage member 102, with the result that exhaust passages 105 remain closed. Thus the brakes are applied with a certain pressure which, for example, may be that resulting from ten pounds of air pressure in the brake cylinders. If the operator wishes to apply the brakes with greater force he moves the control valve 108 upwardly another step in which case a portion at the next right hand end of resistance 112 is short circuited, increasing the magnetization of solenoid 107 so that diaphragm 103, member 104 and member 102 move upwardly again to unseat valve 101. Additional pressure will build up in pipe 65F at this time when valve 101 closes and equilibrium is established in the valve, the pressure of pipe 65A will be higher depending upon the calibration of the apparatus, as say, for example, a pressure of twenty pounds. This operation can be continued until controller 108 has been moved to the point where all of resistance 122 is cut out and a maximum pressure exists in pipe 65F. With this arrangement it will be seen that if the pressure falls in the pipe 65F, valve 101 will be re-opened and a recurrence of operations will occur to bring the pressure back to that corresponding to the setting of the controller 108.

Thus it will be seen that valve 100 performs the same functions as valve 67 and is a self-lapping reducing valve but is controlled electro-magnetically. The operation of the remainder of the system is otherwise the same as that previously described.

It will be apparent to those skilled in the art that the principles and features of this invention may be embodied in various physical forms and in combination with many specific arrangements of apparatus and circuits. I do not desire, therefore, to be strictly limited to the disclosures as given for purposes of illustration, but rather to the scope of the claims granted me.

What I seek to secure by United States Letters Patent is:

1. A combined dynamic and air brake system, comprising a pair of drive motors, current supply circuits for said motors, a two-position switch arranged in one position to connect the armature of each motor in series with the field of the other motor and in another position to complete said current supply circuits, means for operating said switch to either of its two positions, air brakes, means for controlling the supply of air to said brakes, and means to interlock the said brakes whereby when the air brakes are applied said means operates said switch so that said motors are so connected and when the brakes are released said means operates said switch to complete said current supply circuits.

2. In a combined dynamic and air braking system for vehicles, the combination including a pair of electric drive motors for the vehicle, normal operating and control circuits for said motors, a switch for completing said circuits in one position and for connecting the armature of each motor in series with the field of the other when in its other position, air brakes, means for controlling the supply of air to said brakes, and means interconnected with the air brakes and operated whenever the brakes are applied to move said switch to its second position.

3. In a combined dynamic and air braking system for vehicles, the combination including a pair of electric drive motors for the vehicle, normal operating and control circuits for said motors, a switch for completing said circuits in one position and for connecting the armature of each motor in series with the field of the other when in its other position, a motor for operating said switch to said first position, air brakes, means for controlling the supply of air to said brakes, means for operating said switch to its second position whenever the air brakes are applied, and means interconnected with said air brakes for operating said motor to move the switch to said first position when the brakes are released.

4. In a combined braking system for a motor driven vehicle, the combination including a pair of electric driving motors for the vehicle, air brakes for the vehicle, switching means including connections for cross-connecting the armatures and fields of the driving motors to provide a dynamic brake, impedances in said connections for determining the dynamic braking effect of said motors, and means for operating said switching means when the air brakes are applied.

5. In a braking system of the type described for a vehicle, a pair of electric driving motors for said vehicle, air brakes for said vehicle, switching means for establishing normal operating connections for said motors in one position and in another position for connecting the armature of each motor in series with the field of the other motor, means for biasing said switching means to effect said last connections, means for normally positioning said switching means to maintain said normal connections, and means actuated upon the operation of said air brakes for actuating said last means whereby said biasing means operates said switching means.

6. In a braking system of the type described for a vehicle, a pair of electric driving motors for said vehicle, air brakes for said vehicle, switching means for establishing normal operating connections for said motors in one position and in another position for connecting the armature of each motor in series with the field of the other motor, means for biasing said switching means to effect said last connections, means when energized for positioning said switching means to maintain said normal connections, and means actuated upon application of said air brakes for de-energizing said last means whereby said biasing means operates said switching means.

7. A combined dynamic and air brake system for vehicles, comprising in combination a pair of vehicle electric drive motors, operating circuits for said motors including reversing switches whereby the motors may be energized to operate the vehicles in either direction, air brakes for said vehicle, means for connecting the armature of each motor in series with the field of the other motor whenever the air brakes are applied, and means simultaneously operated to lock said reversing switches in either operating position whereby the reversing switches may not be moved to "off" position while the air brakes are applied.

JOHN S. McWHIRTER.